United States Patent [19]

Handke

[11] Patent Number: 5,398,789

[45] Date of Patent: Mar. 21, 1995

[54] METHOD OF MAKING A VIBRATION DAMPER AND A VIBRATION DAMPER AND A METHOD FOR PRODUCING A CONTAINER TUBE-SIDE TUBE UNIT OF A VIBRATION DAMPER, A PREPRODUCT AND AN INTERMEDIATE PRODUCT FOR THIS VIBRATION DAMPER

[75] Inventor: Gönther Handke, Euerbach, Germany

[73] Assignee: Fichtel & Sachs AG, Schweinfurt, Germany

[21] Appl. No.: 163,558

[22] Filed: Dec. 6, 1993

[30] Foreign Application Priority Data

Dec. 4, 1992 [DE] Germany .................. 42 40 837.7

[51] Int. Cl.$^6$ .................. B23K 37/04; B60G 13/00; B21D 39/04; F16F 9/32
[52] U.S. Cl. .................. 188/322.19; 29/434; 29/527.1; 188/299; 188/322.13; 188/318
[58] Field of Search .................. 188/299, 318, 322.19, 188/322.13, 382, 313, 314, 315; 29/434, 527.1, 428, 516, 517, 505, 508, 446, 455.1, 437; 72/112, 113

[56] References Cited

U.S. PATENT DOCUMENTS

| | | | |
|---|---|---|---|
| 4,375,843 | 3/1983 | Itzinger et al. | 188/322.19 |
| 4,480,730 | 11/1984 | Koller et al. | 188/322.19 |
| 4,484,670 | 11/1984 | Axthammer et al. | 188/322.19 |
| 4,508,201 | 4/1985 | Axthammer et al. | 188/322.19 |
| 4,650,042 | 3/1987 | Knecht et al. | |
| 4,802,256 | 2/1989 | Knecht et al. | 188/322.13 |
| 4,850,460 | 7/1989 | Knecht et al. | 188/322.13 |
| 4,913,268 | 4/1990 | Parker et al. | 188/322.19 |
| 5,301,412 | 4/1994 | Hahn et al. | 188/299 |

FOREIGN PATENT DOCUMENTS

| | | |
|---|---|---|
| 2359794 | 6/1974 | Germany . |
| 280229 | 8/1978 | Germany . |
| 3434877 | 4/1986 | Germany . |
| 4114307 | 11/1992 | Germany . |
| 9209505 | 11/1992 | Germany . |

*Primary Examiner*—Douglas C. Butler
*Attorney, Agent, or Firm*—Nils H. Ljungman & Associates

[57] ABSTRACT

A casing for a vibration damper of a motor-vehicle comprises a container tube and a side tube with the side tube axis being substantially transverse to the container tube axis. The side tube is shaped such as to accommodate a bypass valve the opening and closing of which effects a variation of the damping behaviour of the vibration damper. The side tube is made from a side tube preproduct which has a bottom wall and a contact face adapted to the radially outer circumferential surface of the container tube. The side tube is positioned on the radially outer circumferential surface of the container tube by positioning the contact face onto the radially outer circumferential surface of the container tube. Hereupon, the side tube is fastened by welding to the container tube along the circumference of the contact face. Hereupon, a connection passage is made between a cavity of the side tube and a cavity of the container tube.

35 Claims, 4 Drawing Sheets

METHOD OF MAKING A VIBRATION DAMPER AND A VIBRATION DAMPER AND A METHOD FOR PRODUCING A CONTAINER TUBE-SIDE TUBE UNIT OF A VIBRATION DAMPER, A PREPRODUCT AND AN INTERMEDIATE PRODUCT FOR THIS VIBRATION DAMPER

BACKGROUND OF THE INVENTION

1. Field of the Invention

This invention relates to modern vibration dampers, particularly for motor-vehicles, comprise a valve unit which is used for operationally modifying the damping behaviour, e.g. by providing a bypass for a fluid flow path through which a damping fluid and more particularly a damping liquid flows in response to relative movement of a piston rod and a cylinder.

The valve unit can be accommodated within a side-tube of a container tube.

2. Background Information

Vibration dampers of this type are known e.g. from German Publication DE-OS 34 34 877 A1 corresponding to U.S. Pat. No. 4,650,042.

According to these publications, a tube section for accommodating a damping valve unit is welded to the radially outer circumferential surface of a container tube of an oscillation damper. When welding the tube section to the container tube it is unavoidable that the tube section is submitted to deformations and that therefore the tube section must be after the welding operation submitted to time-consuming and expensive after treatment operations. The performance of these after treatment operations is very cumbersome, as the unit obtained by welding the tube section to the container tube must be aligned with respect to the after treatment machines such that the inner surface and the outer surface of the tube section are concentric with respect to each other and more particularly as to avoid angular misalignment of these surfaces and excentricity of these surfaces.

OBJECT OF THE INVENTION

It is an object of the present invention to allow facilitated manufacturing of a container tube-side tube unit and to reduce the costs involved in such manufacturing. A further object of the present invention is to obtain a higher quality assurance when manufacturing such container tube-side tube units, particularly in large series.

SUMMARY OF THE INVENTION

A container tube-side tube unit for a vibration damper comprises a container tube having container tube wall means with a container tube axis and a container tube cavity. A side tube has a side tube wall means with a side tube axis and a side tube cavity. The side tube is fastened to the container tube with the side tube axis being substantially transverse to the container tube axis. The side tube cavity is connected to the container tube cavity through an opening of the container tube wall means. The side tube cavity and the opening confine a side tube cavity-opening space.

For obtaining such a container tube-side tube unit, a container tube preproduct is provided. This container tube preproduct is substantially tubular and comprises the container tube wall means with a radially outer circumferential surface about the container tube axis.

Further, a side tube preproduct is provided. This side tube preproduct has contact face means for being applied to the radially outer circumferential surface of the container tube preproduct.

The side tube preproduct is positioned on the container tube preproduct with the contact face means of the side tube preproduct being engaged with the radially outer circumferential surface of the container tube preproduct.

The side tube preproduct is fastened to the container tube preproduct by a welding operation.

The side tube cavity-opening space is formed after fastening of the side tube preproduct to the container tube preproduct by the welding operation.

By the term "forming the side tube cavity-opening space" one has to understand, on the one hand, forming of the complete side tube cavity-opening space, when the side tube preproduct has a full cross-section along its total length. Moreover, the term "forming of the side tube cavity-opening space" is particularly to comprise also the possibility of finishing the side tube cavity-opening space, when a part of this space is provided by a cavity already existing in the side tube preproduct.

By forming the side tube cavity-opening space only after fastening the side tube preproduct to the container tube preproduct, the positioning operation is facilitated and the alignment of the side tube preproduct with respect to the container tube preproduct may be improved.

It is possible that the side tube preproduct comprises a core portion adjacent the connection face means. In this case, one can obtain the opening of the container tube wall means and the passage through the core portion substantially simultaneously after fastening said side tube preproduct onto the container tube preproduct. E.g., one can provide this opening and this passage by one single material removing operation, such as a punching operation.

According to a preferred performance of the method of the present invention, a side tube preproduct is provided which comprises a lateral wall about the side tube axis and a bottom wall adjacent the connection face means. In this case, one can obtain the opening of the wall means of the container tube and the passage through the bottom wall again substantially simultaneously after fastening the side tube preproduct onto the container tube preproduct. Again, the opening in the wall means of the container tube and the passage in the bottom wall may be obtained by one single material removing operation, such as by a punching operation.

In case of a punching operation, a punching tool may be used which is moved along the side tube axis toward the container tube. For preventing a deformation of the container tube wall means, it may be helpful to introduce a supporting member into the container tube cavity and to bring this supporting member in supporting engagement with an inner surface area of the container tube wall means adjacent the position of the side tube preproduct positioned on the container tube preproduct.

The existence of the core portion or alternatively of the bottom wall prevents during the welding operation a deformation of the side tube preproduct. In order to obtain an optimum securing function of a bottom wall with respect to avoiding deformation of the side tube preproduct during welding operations, a bottom wall should have a wall thickness substantially larger than the wall thickness of the container tube wall means. E.g., the wall thickness of the bottom wall should be at least 1,5×, preferably at least 2×, and more preferably 3× as large as the wall thickness of the container tube wall means at the location of the side tube.

On the other hand, for facilitating a punching operation as mentioned above, the bottom wall of a side tube preproduct should have a wall thickness substantially equal or smaller than the wall thickness of the lateral wall of a side tube preproduct. In this formula, the wall thickness of the lateral wall and the bottom wall should be measured adjacent the transition between bottom wall and side wall. Preferably, the passage through the bottom wall and the opening in the container tube wall means are shaped with identical cross-sectional areas in full overlapping relationship.

The side tube preproduct may be preshaped with contact face means having a substantially part-cylindrical shape which substantially corresponds in radius to the radius of a substantially cylindrical radially outer surface of the container tube wall means.

The side tube preproduct may be preshaped with welding gap confining face means adjacent the contact face means. These welding gap confining face means may be shaped such as to confine in cooperation with the radially outer circumferential surface of the container tube wall means a welding gap, when the contact face means of the side tube preproduct are applied against the radially outer circumferential surface of the container tube wall means. Preferably, the welding gap is substantially constant in cross-section along the total periphery of a welding loop extending around the side tube axis. Such, it is possible to perform a conventional welding operation with the addition of foreign welding material. It should be noted, however, that it is also possible to fasten the side tube preproduct to the container tube preproduct by passage of a high intensity electric current, such as is obtained e.g. in the so called capacitor discharge welding method.

The core portion and the bottom wall, respectively, may be provided with a centering hole such that the side tube preproduct can easily be positioned with respect to the container tube preproduct on a positioning device which may comprise a cradle for receiving the container tube preproduct and a carrier for a positioning rod engageable with the centering hole of the side tube preproduct.

For obtaining welding zones of optimum quality and of optimum tightness against pressurized fluid, it is helpful to exert a biasing force onto the side tube preproduct substantially along the side tube axis and toward the container tube axis after positioning the side tube preproduct on the container tube preproduct and to maintain such an engagement pressure between the contact face and the container tube preproduct during at least a part of the welding operation.

A particular advantage of the present invention is that the side tube preproduct may be provided with internal and external surface means which require no further mechanical treatment after the fastening of the side tube preproduct to the container tube preproduct. Such, the mechanical finishing of the side tube preproduct may be performed before this side tube preproduct is positioned on the container tube preproduct it is easily understandable that such a finishing can be formed by simple turning operations on a lathe. As such, a high degree of concentricity of an outer surface and an inner surface of the side tube is obtained. This high quality is not lost during the following welding operation, because during this welding operation the shape of the side tube preproduct is secured against deformation by the existence of the core portion or at least the bottom wall of the side tube preproduct. The only location where finishing is not possible before the positioning of the side tube preproduct is obviously the location in which the passage through the core portion or the bottom wall is made after welding the side tube preproduct to the container tube preproduct.

It is of high importance for the behaviour of a vibration damper that the connection between the side tube and the container tube is fluid-tight and particularly liquid-tight under superatmospheric pressure of the liquid. Therefore, it is recommended that the welding zone obtained by the welding operation is examined as to fluid tightness of the welding zone. The examination should be performed before forming the side tube cavity-opening space. So, one has the possibility of an additional welding operation for improving fluid tightness in case of discovery of insufficient fluid tightness by the examining operation. This additional welding operation can be performed still before forming the side tube cavity-opening space. As a result of this sequence of operational steps according to the present invention, one has the possibility of amending the welding beam once or even several times under conditions under which the amending welding operations cannot influence the shape of the side tube preproduct and of the container tube preproduct. Only when the last inspection indicates that the required fluid tightness has been obtained, the side tube cavity-opening space is finally formed and all advantages as described above are obtained.

The side tube cavity-opening space is shaped such that a control valve unit as known from the above-mentioned publication can be inserted therein.

The side tube preproduct can be easily produced by well known methods for shaping metallic, ceramic and plastic made bodies. When making the side tube preproduct from metallic material, forging and cold shaping is preferred. It should be noted, however, that also injection moulding and sintering is possible.

After such shaping at least part of internal and external surface areas of the side tube preproduct may be submitted to mechanical treatment by a turning operation on a lathe before positioning the side tube preproduct on the container tube preproduct. So, it is possible to give to these internal and external surface areas the final mechanical finish for use before combining the side tube preproduct with the container tube preproduct. It is easily understandable that this is of high advantage as compared with the known method of manufacturing in which the side tube was welded to the container tube and the final shape of the internal and external surfaces of the side tube preproduct was obtained only after the combination of the side tube and the container tube in order to avoid deformations resulting from the welding operation.

A further aspect of the present invention is to provide a side tube preproduct for a container tube-side tube unit of a vibration damper as defined above. The side tube preproduct of the present invention comprises a lateral wall, a bottom wall and adjacent the bottom wall a contact surface adapted in shape to a radially outer surface of the tube wall means. As mentioned above, the bottom wall may be replaced by a core portion extending substantially along the total length of the side tube preproduct. The bottom wall may again have a wall thickness considerably larger than the wall thickness of the container tube wall means. The bottom wall or alternatively the core portion may be provided with a centering hole. At least part of the inner and outer surface areas of the side tube preproduct may be in condition ready for use such that they require substantially no further mechanical treatment after assembling the side tube preproduct with a container tube preproduct.

According to a further aspect of the present invention, an intermediate product for a container tube-side tube unit is provided. This intermediate product comprises a container tube preproduct and a side tube preproduct welded onto said container tube preproduct. The side tube preproduct has a bottom wall or—alternatively—a core portion adjacent the radially outer surface of the container tube wall means. The container tube wall means are substantially closed in an area overlapping with the bottom wall. The bottom wall has a wall thickness substantially larger than the wall thickness of the container tube preproduct in an area adjacent said side tube preproduct.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to the embodiments shown in the accompanying drawings in which.

DESCRIPTION OF THE PREFERRED EMBODIMENTS

Figure 1:
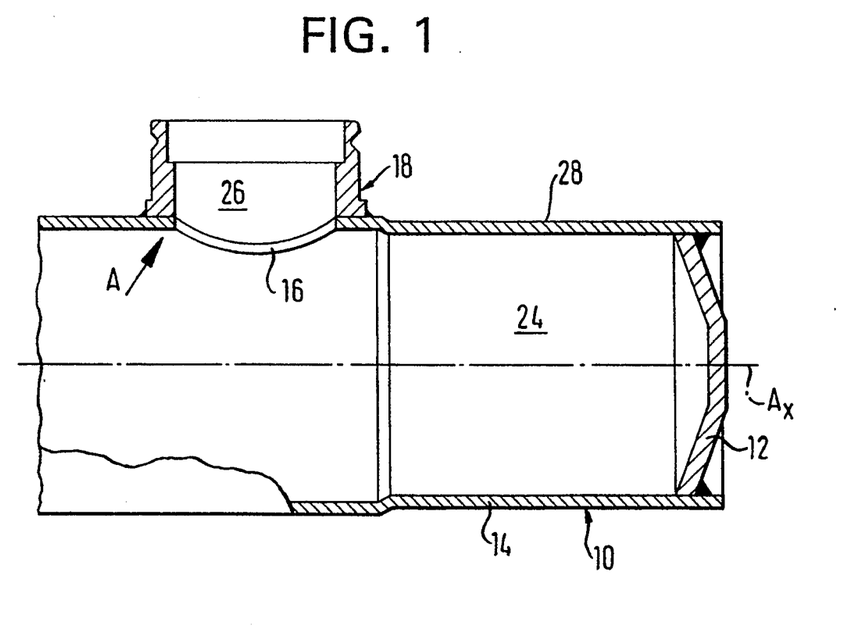
FIG. 1 shows a container tube-side tube unit of a vibration damper in longitudinal section along the axis of the container tube.
Figure 1A:
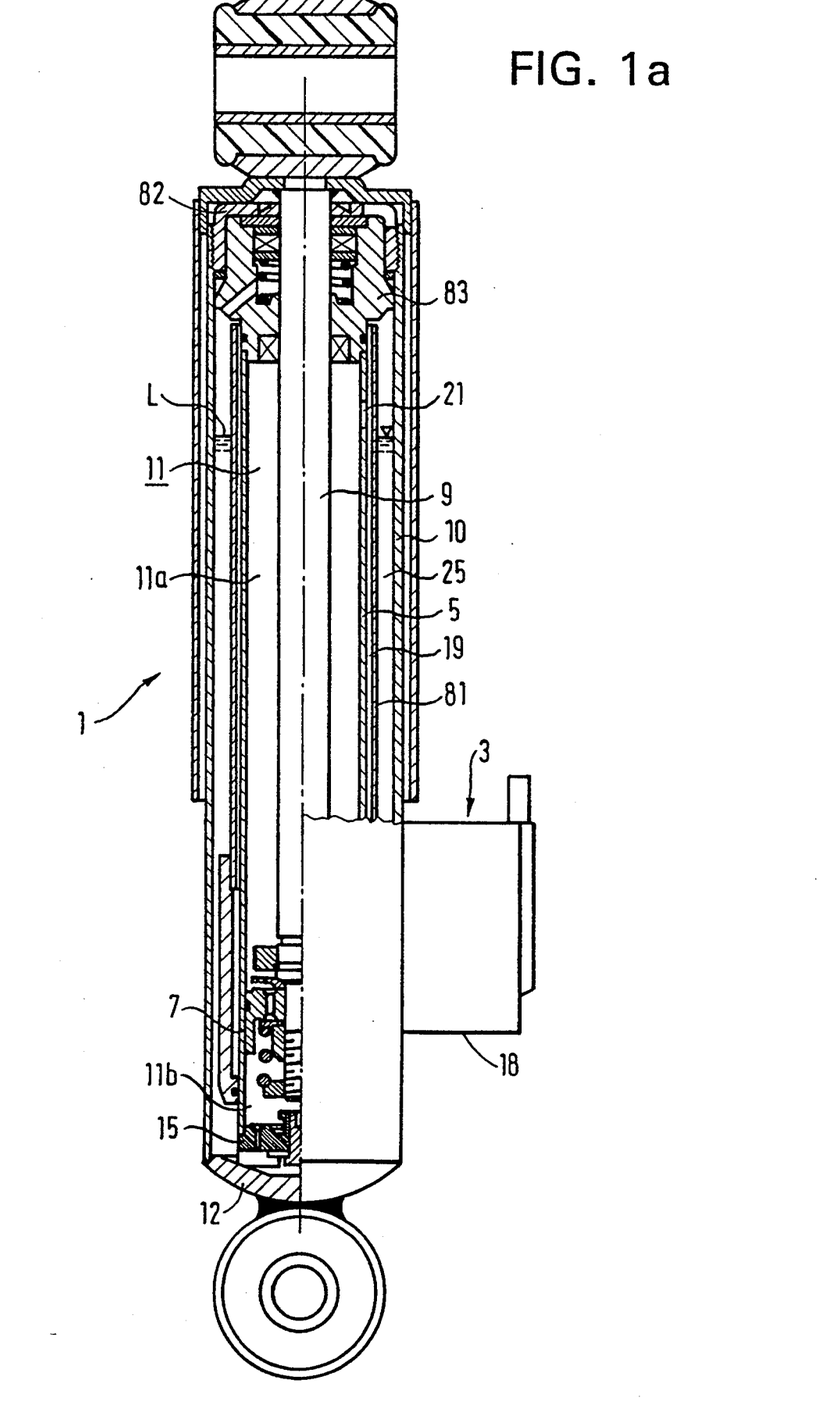
FIG. 1a shows a vibration damper.

FIG. 1a shows a complete oscillation damper 1, a detailed illustration of the valve unit 3 being omitted for the sake of clarity. The oscillation damper 1 consists essentially of a pressure pipe 5 in which a piston 7 on a piston rod 9 divides a working space 11 into an upper or piston-rod-side working chamber 11b. A bottom valve unit 15 closes the pressure pipe 5 at the lower end thereof. A fluid path 19 is formed between the pressure pipe 5 and an intermediate pipe 81 said intermediate pipe 81 being arranged concentrically with respect to the pressure pipe 5. A connecting orifice 21 in the pressure pipe 5 connects the upper working chamber 11a with the fluid path 19. A compensating chamber 25 is confined between the intermediate pipe 81 and a portion of the pressure pipe 5, on the one hand, and the container tube 10 on the other hand. This compensating chamber 25 is axially limited by a base member 12 and a piston rod guiding said sealing unit 83. The working space 11 is separated by the piston 7 into the upper working chamber 11a and the lower working chamber 11b. Both the upper and the lower working chamber are filled with a liquid. The compensating chamber 25 is also filled with damping liquid up to the level L and contains a possibly pressurized gas above the Level L. The bottom valve unit 15 provides communication between the working chamber 11b and the compensating chamber 25. The piston 7 provides communication between the lower working chamber 11b and the upper working chamber 11a. According to the illustrative example the oscillation damper works as follows: When the piston rod 9 moves upwards, a high flow resistance occurs across the piston 7 and a high pressure is generated in the upper working chamber 11a. Liquid from the upper working chamber 11a flows through said high flow resistance into the lower working chamber 11b. As the piston rod 9 moves outward of the working space 11, the available volume within the working space 11 is increased. Therefore, liquid can flow from the compensating chamber 25 through the bottom valve unit 15 into the lower working chamber 11b. The flow resistance through the bottom valve unit 15 is small in this phase of operation. The movement of the piston rod 9 with respect to the pressure pipe 5 is damped.

On inward movement of the piston rod 9 fluid flow from the lower working chamber 11b through the piston 7 into the upper working chamber 11a. The flow resistance across the piston 7 is relatively small and the flow resistance across the bottom valve unit 15 is relatively large. Therefore, a considerable pressure exists even within the upper working chamber 11a. The volume within the working space 11 is reduced by the piston rod 9 entering into the working space 11. Thus, damping liquid must flow from the lower working chamber 11b through the bottom valve unit 15 into the compensating chamber 25. In this phase of operation the flow resistance through the bottom valve unit 15 is high such that a high pressure occurs within the lower working chamber 11b and also within the upper working chamber 11a.

By the connecting orifice 21 and the fluid path 19 the upper working chamber 11a is connected with the compensating chamber 25 via the valve unit 3. This is shown in more detail in FIG. 1b, which will be described later. As long as the valve unit 3 is closed, the bypass established by the connecting orifice 21, the fluid path 19 and the valve unit 3 is also closed. This is the hardest mode of operation of the oscillation damper. When, however, the valve unit 3 is more or less opened, the bypass is also open. As a result thereof the following behavior exists: On upward movement of the piston rod 9 liquid can flow from the highly pressurized upper working chamber 11a not only across the piston 7 providing a high flow resistance but also from the working chamber 11a through the bypass 21, 19, 3 to the compensating chamber 25. Such, the damping force is reduced.

When the piston rod 9 moves downwards, there exists again a high pressure within the upper working chamber 11a, as described above. Therefore, damping liquid can flow from the upper working chamber 11a through the bypass 21, 19, 3 to the compensating chamber 25. This means that the damping liquid which must be expelled from the working space 11 as a result of the reduced volume therein does not only escape through the bottom valve unit 15 to the compensating chamber 25 but can also partially escape through the bypass 21, 19, 3 to the compensating chamber 25. Such, the damping force is again reduced by the open bypass 21, 19, 3. It is to be noted that the direction of flow of the damping liquid through the bypass 21, 19, 3 is the same, both on upward movement and downward movement of the piston rod 9 with respect to the pressure pipe 5. By increasing the flow resistance through the valve unit 3 the damping force can be increase both for upward and downward movement of the piston rod 9, and by increasingly opening the valve unit 3 the damping force can be reduced both for upward movement and downward movement of the piston rod 9. It is possible to selectively open and close the valve unit or to continuously vary the flow resistance through the valve unit 3.

Figure 1B:
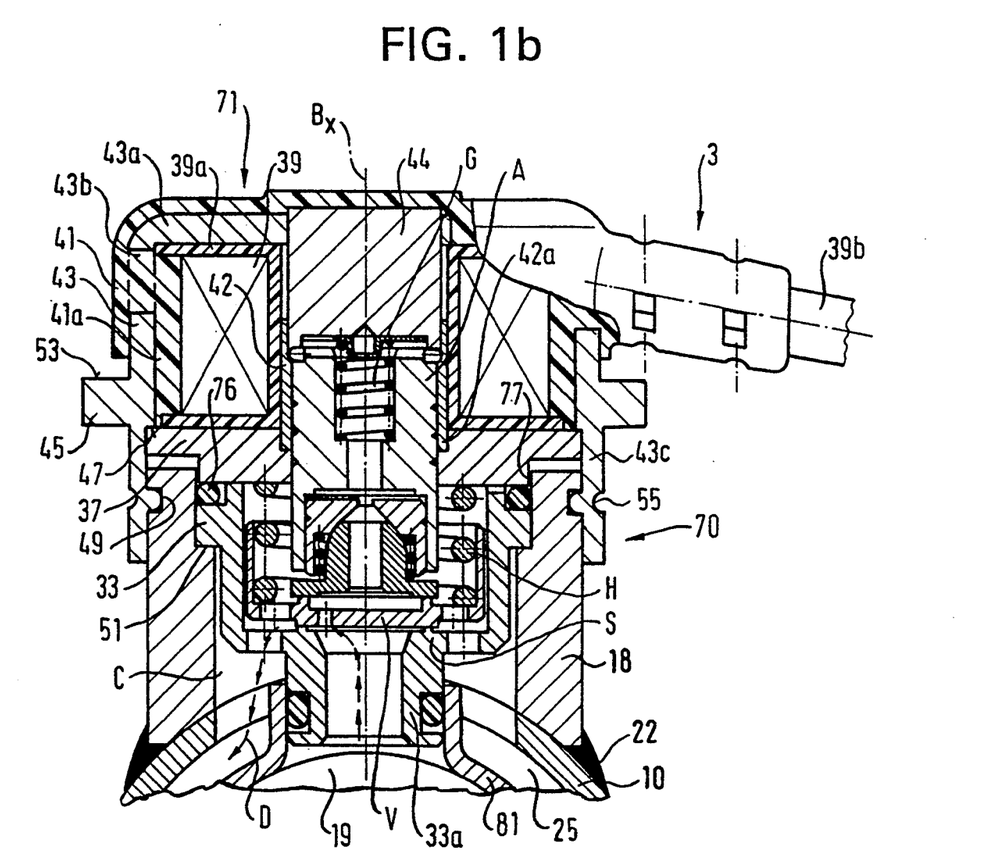
FIG. 1b shows a cross section of a vibration damper in the vicinity of the valve unit.
Figure 2:
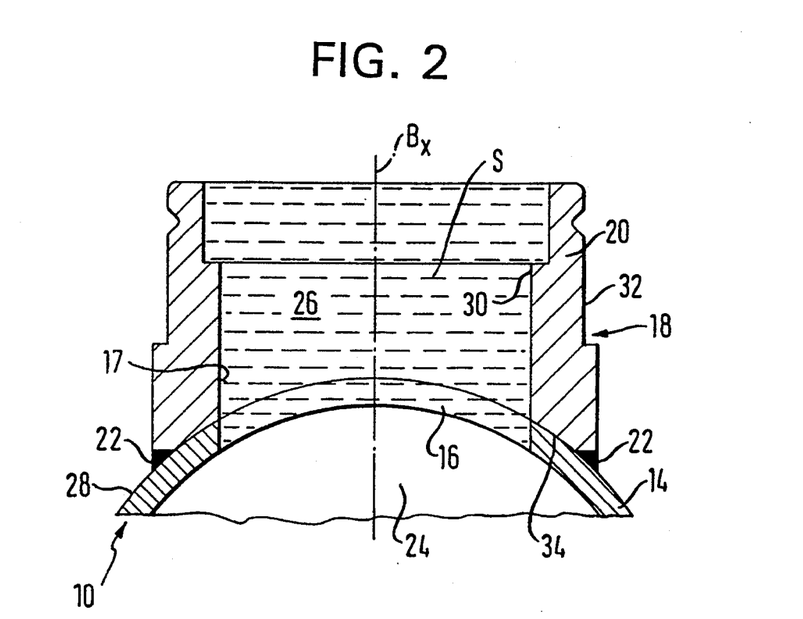
FIG. 2 shows an enlarged detail of FIG. 1 at the location A.

In FIG. 1b one can again see the fluid path 19 and the compensating chamber 25, which are interconnectable through the valve unit 3. The fluid path 19 is connected to the upper working chamber 11a as shown in FIG. 1. The flow direction from the fluid path 19 to the compensating chamber 25 across the valve unit 3 is indicated in FIG. 2 by the dotted line D provided with arrows indicating the flow direction both for inward movement and outward movement of the piston rod 9 with respect to the pressure pipe 5. One can see in FIG. 1b a valve member v which can be lifted with respect to a valve seat S, such as to open the flow path D from the fluid path 19 to the compensating chamber 25. For more details as to the function of the valve unit 3 it is referred to the above-mentioned German publication DE-OS 40 24 920A1 published on Feb. 13, 1992, to the corresponding U.S. patent application Ser. No. 07/738,155, filed on Jul. 30, 1991, and now pending as a continuation application and to the corresponding British Publication GB 22 47 933A published on Mar. 18, 1992. For explaining the principles of the present invention it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 39 which is energized through a current supple cable 39b. Further details of the construction and operation can be taken from the above-mentioned specifications.

The valve unit 3 comprises a housing 70. This housing 70 is composed by the side tube 18 and a cover unit 71. The side tube 18 is welded at 22 to the container tube 10. The cover unit 71 is fastened to the side tube 18.

A pot-shaped valve components housing 33 is inserted into the side tube 18 and is axially located on a shoulder face 51 inside the side tube 18. Various valve components are located inside the valve components housing 33. The lower end of the valve components housing 33 is shaped as a tube section 33a, which provides the valve seat S and is sealingly connected to the fluid path 19.

The cover unit 71 comprises an iron jacket 43 integral with an iron end wall 43a. The iron jacket 43 and the iron end wall 43a are coated with a plastic layer 41. An annular electromagnetic coil 39 is housed within the iron jacket 43. This electromagnetic coil 39 is carried by a coil carrier 32a, which is annular about the axis $B_x$ and is open in radial outward direction. The coil carrier 39a is closed in radially outward direction by a plastics material 41a integral with the plastic layer 41 through openings 43b of the iron jacket 43. The plastics layer 41 and the plastics material 41a are integrally moulded by injection moulding with the iron jacket 43, the iron end wall 43a integral therewith and the electromagnetic coil 39 carrier 39a being inserted into the injection mould.

A ferromagnetic core 44 is inserted into a central opening of the iron end wall 43a and covered by the plastic layer 41. An iron flange portion 37 is provided at the lower side of the electromagnetic coil 38 and is engaged with a shoulder face 47 of the iron jacket 43. A pole tube 42 is seated within an annular recess 42a of the iron flange portion 37. The pole tube 42 is sealingly connected to the iron flange portion 37 and to the ferromagnetic core 44. The armature A is guided within the pole tube 42. The pole tube 42 is made of nonmagnetic material so that the magnetic field lines are deflected by the lower end of the pole tube 42. The iron jacket 43, the iron end wall 43a, the ferromagnetic core 44 and the iron flange portion 37 form a ferromagnetic core arrangement which toroidally surrounds the electromagnetic coil 39.

The cover unit 71 is fastened to the side tube 18 by a sleeve-shaped extension 43c of the iron jacket 43. This sleeve-shaped extension 43c axially overlaps the side tube 18 by a circumferential bead 55 being embossed into a circumferential groove 49 on the radially outer face of the side tube 18. The iron jacket 43 is provided with a pretensioning flange 45. The pretensioning flange 45 offers a pretension face 53. The cover unit 71 can be pretensioned in downward direction as shown in FIG. 1b toward the container tube 10 by a pretensioning tool engaging the container tube 10, on the one hand, and the pretensioning face 53, on the other hand. Such, the iron flange portion 37 is pressed against the upper end of the valve components housing 33, the valve components housing 33 is engaged with the shoulder face 51 of the side tube 18, and the iron flange portion 37 is engaged with the shoulder face 47 of the iron jacket 43. The helical compression spring H is compressed between the iron flange portion 37 and the valve member V, which is seated on the valve seat S.

While maintaining this pretension of the cover unit 71 against the side tube 18, the bead 55 is rolled or caulked into the circumferential groove 49 of the side tube 18 so that after removing the pretensioning tool an internal pretension is maintained. A sealing ring 76 is, therefore, maintained in sealing engagement with the valve components housing 33, the iron flange portion 37 and the side tube 18. Such, the compartment C confined by the side tube 18 and the cover unit 71 is sealed against atmosphere. All components of the valve unit 3 are positioned with respect to each other, and the helical compression spring H as well as the helical compression spring G and further springs are biased to the desired degree.

It is to be noted that the upper end of the side tube 18 is radially engaged at 77 with the iron flange portion 37 such that when rolling or caulking the bead 55 into the groove 49, no deformation of the side tube 18 and of the iron jacket 43 can occur.

The electromagnetic coil 39 is completely separated from the liquid within the compartment C by the iron flange portion 37. The pretension during connecting the cover unit 71 and the side tube 18 is selected such that no plate can occur.

The method of producing the container tube-side tube unit as described below is part of the method of producing the oscillation damper as shown in FIGS. 1a and 1b. The method of producing the oscillation damper as shown in FIGS. 1a and 1b is as follows: The container tube 10 is provided with the base member 12 by welding. The side tube 18 is fastened to the container tube 10 as illustrated and described with respect to FIGS. 1 to 4.

Hereupon, the bottom valve unit 15, the pressure pipe 5 and the intermediate pipe 81 are inserted into the container tube 10. Hereupon, the piston 7, preassembled with the piston rod 9, is inserted into the pressure pipe 5. The preassembled unit comprising the piston 7 and the piston rod 9 may at this phase of assembling already be combined with the piston rod 7 into the pressure pipe 5 the piston rod guiding and sealing unit 83 approaches the upper ends of the pressure pipe 5 and the intermediate pipe 81. The piston rod guiding and sealing unit 83 is simultaneously brought into engagement with the upper end of the container tube 10 and the respective upper ends of the pressure pipe 5 and the intermediate pipe 81. Hereupon, the piston rod guiding and sealing unit 83 is secured with respect to the container tube 10 by a screw cap 87 which is screwed into inner thread means of the container tube 10. By the screwing of the screw cap 87 into the container tube 19 the piston rod guiding and sealing unit 83 is approached toward the base pipe 5, the intermediate pipe 81, the bottom valve unit 15 and the piston rod guiding and sealing unit 83 with respect to each other and with respect to the container tube 10 and the base member 12 is obtained. Hereupon, the valve unit 3 may be completed, as shown in FIG. 1b, by inserting the valve components housing 33 with a part of the valve components preassembled therewith into the side tube 18 and, hereupon, mounting the cover unit 71 with the rest of the valve components preassembled therewith onto the side tube 18. Finally, the liquid and gas fillings may be introduced into the oscillation damper unit in a conventional way.

It is to be noted that the above described method is only for giving an example. The method may be modified in many respects. Particularly there are many possibilities of preassembling various components during the assembling of the oscillation damper.

FIG. 1, a container tube of a vibration damper for a motor-vehicle is designated by 10. One can see a bottom plate 12 of this container tube 10. At the left-hand end of the container tube 10 there is provided a piston rod guiding and sealing unit through which a piston rod is introduced into the vibration damper. This is not shown in detail in the drawings. It can be referred, however, again to the German Publication DE-OS 34 34 877 and to the corresponding U.S. Patent as mentioned above.

The container tube 10 comprises a tube wall 14 substantially cylindrical about the axis $A_x$.

The tube wall 14 is provided with an opening 16 and a side tube 18 is welded to the container tube 14 in alignment with the opening 16. The side tube 18 has a side tube axis $B_x$ and a side tube wall 20.

The side tube 18 is welded to the container tube 14 by a welding seam 22. A container tube cavity 24 is confined within the container tube 14, and a side tube cavity 26 is confined within the side tube wall 20.

The container tube wall 14 has a substantially cylindrical radially outer circumferential surface 28. The side tube wall 20 has a radially inner circumferential surface 30 and a radially outer circumferential surface 32, both surfaces 30 and 32 being substantially cylindrical about the axis $B_x$. Moreover, the side tube wall 20 has a contact surface 34 which is annularly closed and follows the radially outer cylindrical circumferential surface 28 of the container tube wall 14. The side tube cavity 26 and the opening 16 of the container tube wall 14 define a space which is characterized in FIG. 2 by horizontal dotted lines and is designated by S. This space S is provided for accommodating a bypass valve unit or the like of a vibration damper as shown in the German Publication DE-OS 34 34 877 Al and in the corresponding U.S. Patent as mentioned above.

Figure 3:
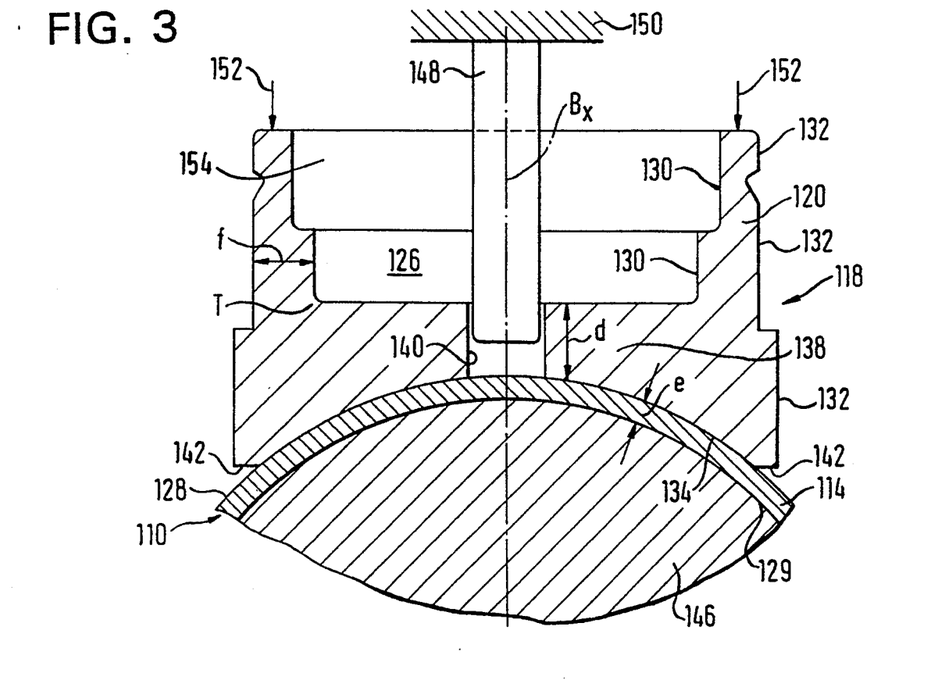
FIG. 3 shows the operational step of the method of the invention in which a side tube preproduct; is positioned with respect to a container tube preproduct

In FIG. 3, one can recognize a container tube preproduct 110 and a side tube preproduct 118. The container tube preproduct 110 is different from the container tube 10 of FIG. 2, particularly in that the opening 16 of FIG. 2 is still lacking. The surfaces of the container tube preproduct 110 are designated by the same reference numerals as the corresponding surfaces of FIG. 2 increased by 100.

The side tube preproduct 118 is different from the side tube 18 of FIG. 2 particularly in that a bottom wall 138 is provided at the lower end of the side tube preproduct 118. This bottom wall 138 is provided with a contact surface 134. This contact surface 134 is substantially cylindrical and has substantially the same radius as the radially outer surface 128 of the container tube wall means 114. The side tube wall 20 of FIG. 2 appears in the side tube wall preproduct 118 as a lateral wall 120. The bottom wall 138 is provided with a hole 140.

The side tube preproduct 118 is obtained by forging or cold shaping. The raw shape obtained by forging or cold shaping is finished by turning the circumferential surfaces 130 and 132 on a lathe. Such perfectly concentric surfaces 130 and 132 may be obtained which require no further mechanical treatment after welding the side tube preproduct 118 to the container tube preproduct 110. The hole 140 may be obtained by a punching or boring operation.

The contact surface 134 may also be obtained in raw shape by the forging or cold-shaping operation and may be thereafter treated by usual mechanical material removing treatment. Moreover, a welding gap confining face 142 is provided on the side tube preproduct 118 which defines a welding gap which may later be filled with welding material. The welding gap confining surface 142 is preferably shaped such that it confines in cooperation with the cylindrical radially outer circumferential surface 128 of the container tube wall 114 a welding gap which has substantially constant cross-sectional area along the total loop of the welding seam.

One can see from FIG. 3 that the container tube preproduct 110 is supported on a support member 146 by its radially inner circumferential surface 129 and that the side tube preproduct 118 is guided by a guiding rod 148 which is in guiding engagement with the hole 140. The guiding rod 148 is carried by a carrier 150, which carrier 150 may be fixed by an adjustable connection with respect to the support member 146. The guiding rod 148 may be movable along the axis $B_x$ with respect to the carrier 150 so that it can be withdrawn into the carrier 150 for inserting the side tube preproduct 118 in the position as shown. Hereupon, the guide rod 148 is moved downwards again into the guiding position as shown in FIG. 3. Such, the side tube preproduct 118 can be brought in a well defined position with respect to the container tube 110 which may be axially and angularly precisely located with respect to the support member 146 by abutment means (not shown). Now, the side tube preproduct 118 may be urged by a press indicated by arrows 152 against the radially outer circumferential surface 128 of the container tube wall 114 such that the container tube wall 114 is brought in intimate contact with the support member 146, and the contact surface 134 of the side tube preproduct 118 is brought in intimate contact with the radially outer circumferential surface 128 of the container tube wall 114. Then, the welding seam 22 as shown in FIG. 2 can be established. One can recognize that during the welding operation the bottom wall 138 stabilizes the side tube preproduct 118 so that this side tube preproduct 118 is not deformed by the heat generated during the welding operation. Such, the surfaces 130 and 132 maintain their shape.

It is to be noted that the wall thickness d of the bottom wall 138 is considerably larger than the wall thickness of the container tube wall 114 which is designated by e. E.g., the wall thickness d is 3 x as large as the wall thickness of the container tube wall 114. This is helpful for stabilizing the side tube preproduct 118 during the welding operation.

When the side tube preproduct 118 has been welded to the container tube preproduct 110, the tightness of the welding seam as shown in FIG. 2 can be examined e.g. by generating an examination pressure within the chamber 126. When the welding seam is tight, no fluid can escape through the hole 140 and through the welding seam. This is a confirmation that the welding seam is perfect. When, however, the examination pressure within the chamber 126 decreases, this is a hint that the welding seam 22 must be improved. The location where improvement is necessary may be easily found by immersing the arrangement as seen in FIG. 3 into a liquid and to observe eventual bubbles at the welding seam. Then the welding seam may be improved by a further welding operation. This further welding operation again does not result in deformations of the side tube pre-product 118 because the bottom wall 138 is still present.

Figure 4:
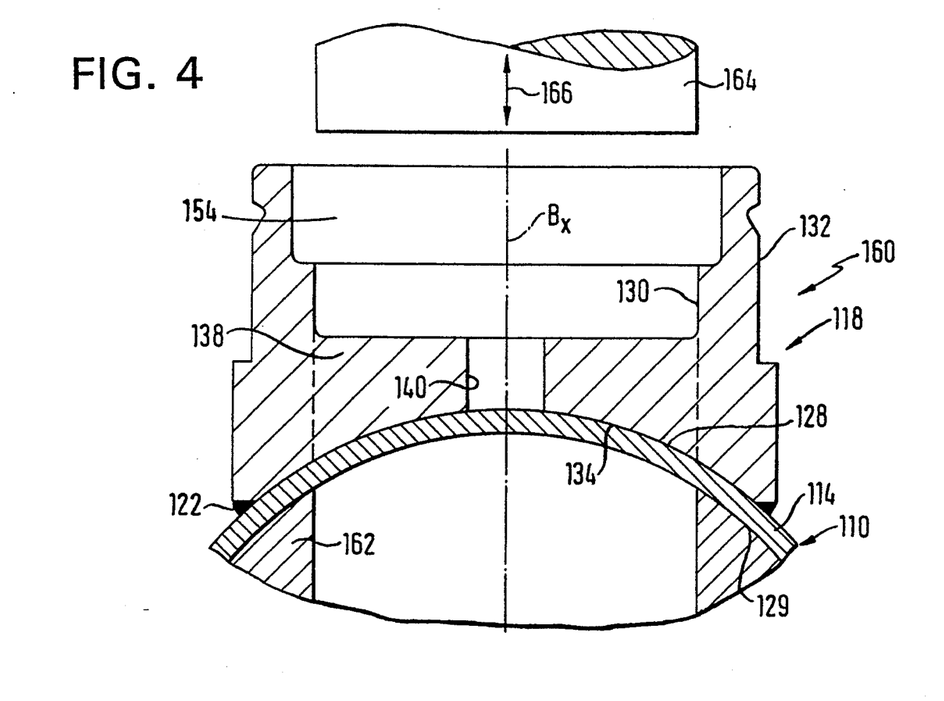
FIG. 4 shows a further operational step in which the side tube preproduct is already welded to the container tube preproduct and a punching tool is ready for punching a passage through the bottom wall of the side tube preproduct and an opening through the wall of the container tube preproduct.

In FIG. 4, one can recognize an intermediate product 160 which comprises the container tube 110 and the side tube 118 welded thereto by the welding seam 122. This intermediate product 160 has been inserted into a punching device. This punching device comprises a punching die 162 supporting the radially inner circumferential surface 129 of the container tube wall 114 and a punching tool 164. The punching tool 164 is guided substantially along the side tube axis $B_x$ and is movable upwards and downwards in the direction of the arrow 166. When the punching die 164 is moved downwards, the bottom wall 138 is punched from the side tube preproduct 118 and the opening 16 is formed. The removal of the bottom wall 138 results in the formation of a passage 17 as shown in FIG. 1.

For the punching step it is desirable that the wall thickness d of the bottom wall 138 is not considerably larger than the wall thickness f of the lateral wall 120 adjacent the transition T between the lateral wall 120 and the bottom wall 138.

It is to be noted that the above-mentioned examination step can also be performed in joining the bore 140 to a source of pressurized fluid, e.g. pressurized gas.

It is to be noted that the passage 17 and the opening 16 are formed in one shot by the punching operation.

It is easily to be understood that the punching operation can be replaced by e.g. a boring operation.

While in the preceding specification the terms "side tube 18" and "side tube preproduct 118" have been used, it is easily to be understood that the preproduct 118 is not necessarily of tubular shape. Any shape is possible which can be transformed into a compartment for receiving the valve unit. The terms "side tube" and "side tube preproduct" are to be understood in the broad sense of a housing and a housing preproduct, respectively, when used in the specification and in the claims.

It is easily to be understood that in FIG. 3 the carrier 150 can be movable together with the guiding rod 148 and that the press faces 152 can be integral with the carrier 150.

While specific embodiments of the invention have been shown and described in detail to illustrate the application of the inventive principles, it will be understood that the invention may be embodied otherwise without departing from such principles.

The reference numerals in the claims are only used for facilitating the understanding and are by not means restrictive. Some types of vibration dampers or shock absorbers and a method for assembling the same, in which the present invention maybe produced, are disclosed in the following patents: U.S. Pat. No. 4,443,926 to Pearson et al. on Apr. 24, 1984, entitled "Method of Assembling Shock Absorbers"; U.S. Pat. No. 4,022,448 to Reeder on May 10, 1977, entitled "Vehicle Suspension Unit and Method of Assembly Thereof"; U.S. Pat. No. 3,999,274 to Butler on Dec. 28, 1976, entitled "Shock Absorber and Method and Apparatus for Assembling the Same"; U.S. Pat. No. 4,216,570 to Farris et al. on Aug. 12, 1980, entitled "Method of Assembling a Shock Absorber Employing a Coil Spring"; and U.S. Pat. No. 4,106,175 to Meyer on Aug. 15, 1978, entitled "Method and Apparatus for Manufacturing Combination Shock Absorbers".

The invention as described hereinabove in the context of the preferred embodiments is not to be taken as limited to all of the provided details thereof, since modifications and variations thereof may be made without departing from the spirit and scope of the invention.

I claim:

1. A method for producing a vibration damper having a container tube-side tube unit, said container tube-side tube unit comprising a container tube having container tube wall means for defining a container tube cavity and having a container tube axis, said container tube side tube unit further comprising a side tube having side tube wall means for defining a side tube cavity and having a side tube axis, said side tube being fastened to said container tube with said side tube axis being substantially transverse to said container tube axis, said side tube cavity being connected to said container tube cavity through an opening of said container tube wall means, said side tube cavity and said opening confining a side tube cavity-opening space, said method comprising the following steps of assembling the vibration damper by:

providing a piston, a piston rod, and a working cylinder;

connecting the piston to the piston rod;

inserting the piston and the piston rod into the working cylinder;

providing a container tube preproduct having said container tube wall means with a radially outer circumferential surface about said container tube axis;

providing a side tube preproduct, said side tube preproduct having contact face means for being applied to said radially outer circumferential surface of said container tube preproduct;

positioning said side tube preproduct on said container tube preproduct with said contact face means of said side tube preproduct being engaged with said radially outer circumferential surface of said container tube preproduct;

fastening said side tube preproduct to said container tube preproduct by a welding operation;

forming said side tube cavity-opening space; and disposing the container tube about a portion of the piston rod.

2. A method as claimed in claim 1, further comprising providing said side tube preproduct with a core portion adjacent said contact face means and obtaining said opening and a passage through said core portion substantially simultaneously after fastening said side tube preproduct onto said container tube preproduct.

3. A method as claimed in claim 2, further comprising providing said opening and said passage by one single material removing operation.

4. A method as claimed in claim 3, said material removing operation comprising a punching operation.

5. A method as claimed in claim 4, said punching operation being performed by a punching tool moved along said side tube axis toward said container tube axis with a supporting member being introduced into said container tube cavity and being in supporting engagement with an inner surface area of said container tube wall means adjacent said side tube preproduct positioned on said container tube preproduct.

6. A method as claimed in claim 2, further comprising providing said passage and said opening with substantially identical cross-sectional areas.

7. A method as claimed in claim 2, further comprising providing a centering hole in said core portion.

8. A method as claimed in claim 7, further comprising positioning said side tube preproduct on said container tube preproduct by guiding said container tube preproduct along a guiding rod, said guiding rod being in guiding engagement with said centering hole.

9. A method as claimed in claim 1, further comprising providing said side tube preproduct with a lateral wall about said side tube axis and a bottom wall adjacent said contact face means and obtaining said opening and a passage through said bottom wall substantially simultaneously after fastening said side tube preproduct onto said container tube preproduct.

10. A method as claimed in claim 9, further comprising configuring said bottom wall to have a wall thickness substantially larger than the wall thickness of said container tube wall means.

11. A method as claimed in claim 9, further comprising configuring said bottom wall to have a wall thickness substantially equal or smaller than the wall thickness of said lateral wall.

12. A method as claimed in claim 9 further comprising providing said opening and said passage by one single material removing operation.

13. A method as claimed in claim 12, said material removing operation comprising a punching operation.

14. A method as claimed in claim 13, said punching operation being performed by a punching tool moved along said side tube axis toward said container tube axis with a supporting member being introduced into said container tube cavity and being in supporting engagement with an inner surface area of said container tube wall means adjacent said side tube preproduct positioned on said container tube preproduct.

15. A method as claimed in claim 9, further comprising providing said passage and said opening with substantially identical cross-sectional areas.

16. A method as claimed in claim 9 further comprising providing a centering hole in said bottom wall, respectively.

17. A method as claimed in claim 16, further comprising positioning said side tube preproduct on said container tube preproduct by guiding said container tube preproduct along a guiding rod, said guiding rod being in guiding engagement with said centering hole.

18. A method as claimed in claim 1, further comprising providing said contact face means of said side tube preproduct with a substantially part-cylindrical shape substantially corresponding in radius to a substantially cylindrical radially outer surface of said container tube wall means.

19. A method as claimed in claim 1, further comprising providing said side tube preproduct with face means for defining a welding gap adjacent said contact face means, said means for defining a welding gap being shaped such as to confine in cooperation with said radially outer circumferential surface of said container tube wall means a welding gap when said contact face means of said side tube preproduct are applied against said radially outer circumferential surface of said container tube wall means.

20. A method as claimed in claim 1, further comprising exerting a biasing force onto said side tube preproduct substantially along said side tube axis and toward said container tube axis after positioning said side tube preproduct on said container tube preproduct and at least during a part of said welding operation.

21. A method as claimed in claim 1, further comprising providing a surface treatment of at least a part of an internal surface and an external surface of said side tube preproduct before said positioning such as to avoid further mechanical treatment of the internal and external surfaces after said fastening.

22. A method as claimed in claim 1, further comprising finishing a complete internal surface of said side tube preproduct before positioning said side tube preproduct on said container tube preproduct except for a partial area in which a passage toward said container tube cavity is to be formed after fastening said side tube preproduct to said container tube preproduct.

23. A method as claimed in claim 1, further comprising examining a welding zone obtained by said welding operation as to fluid tightness thereof.

24. A method as claimed in claim 23, said examining being performed before forming said side tube cavity-opening space.

25. A method as claimed in claim 23, further comprising an additional welding operation for improving fluid tightness in case of discovery of insufficient fluid tightness by said examining.

26. A method as claimed in claim 25, said additional welding operation being performed before forming said side tube cavity-opening space.

27. A method as claimed in claim 1, said side tube cavity-opening space being shaped for accommodating a control valve unit.

28. A method as claimed in claim 1, said method further comprising forming said side tube preproduct by one of a forging and cold shaping operation.

29. A method as claimed in claim 1, at least part of internal and external surface areas of said side tube preproduct being submitted to mechanical treatment by a turning operation before positioning said side tube preproduct on said container tube preproduct.

30. A vibration damper formed from a container tube-side tube unit, said container tube-side tube unit comprising a container tube having container tube wall means for defining a container tube cavity and having a container tube axis, said container tube-side tube unit further comprising a side tube having side tube wall means for defining a side tube cavity and having a side tube axis, said side tube being fastened to said container tube with said side tube axis being substantially transverse to said container tube axis, said side tube cavity being connected to said container tube cavity through an opening of said container tube wall means, said side tube cavity and said opening defining a side tube cavity-opening space, said vibration damper comprising a chamber surrounded by said container tube, said chamber containing a damping fluid; said vibration damper further comprising: a piston rod sealingly projecting into said chamber and being axially displaceable within said chamber, and a piston being attached to said piston rod, said piston being slidably disposed within said chamber to divide said chamber into first and second chambers; said container tube-side tube unit having been formed by fastening a side tube preproduct to said container tube and by subsequent processing of said container tube and of said side tube preproduct, said container tube wall means having a radially outer surface and a radially inner surface, said radially outer surface being disposed further away from said container tube axis than is said radially inner surface; said side tube preproduct having comprised during assembly: a lateral wall, a bottom wall and a contact surface, said contact surface having been disposed adjacent said bottom wall during assembly; said contact surface having been configured during assembly to make contact with said container tube and to conform to said radially outer surface of said container tube wall means.

31. A vibration damper as claimed in claim 30, wherein said bottom wall of said side tube preproduct has comprised, during assembly, a wall thickness considerably larger than the wall thickness of said container tube wall means.

32. A vibration damper as claimed in claim 30, wherein said bottom wall of said side tube preproduct has been provided, during assembly, with a centering hole.

33. A vibration damper as claimed in claim 30, wherein at least part of inner and outer surface areas of said side tube are in a condition ready for use such that they require substantially no further mechanical treatment after said side tube preproduct has been assembled with a container tube preproduct.

34. A vibration damper formed from an intermediate product of a container tube-side tube unit, said container tube-side tube unit comprising a container tube having container tube wall means for defining a container tube cavity and having a container tube axis, said container tube-side tube unit further comprising a side tube having side tube wall means for defining a side tube cavity and having a side tube axis, said side tube being fastened to said container tube with said side tube axis being substantially transverse to said container tube axis, said side tube cavity being connected to said container tube cavity through an opening of said container tube wall means, said side tube cavity and said opening defining a side tube cavity-opening space, said container tube wall means having a radially outer surface and a radially inner surface, said radially outer surface being disposed further away from said container tube axis than is said radially inner surface, said intermediate product having comprised, during assembly, a container tube preproduct and a side tube preproduct, said side tube preproduct having been welded onto said container tube preproduct during assembly, said side tube preproduct having comprised, during assembly, a bottom wall adjacent said radially outer surface of said container tube wall means, said container tube wall means having been substantially closed during assembly in an area overlapping with said bottom wall; said vibration damper comprising a chamber surrounded by said container tube, said chamber containing a damping fluid; said vibration damper further comprising: a piston rod sealingly projecting into said chamber and being axially displaceable with within said chamber and a piston being attached to said piston rod, said piston being slidably disposed within said chamber to sealingly divide said chamber into first and second chambers.

35. A vibration damper as claimed in claim 34, wherein said bottom wall of said side tube preproduct has comprised, during assembly, a wall thickness substantially larger than the wall thickness of said container tube preproduct in an area adjacent said side tube preproduct.

* * * * *

UNITED STATES PATENT AND TRADEMARK OFFICE
CERTIFICATE OF CORRECTION

PATENT NO. : 5,398,789
DATED : March 21, 1995
INVENTOR(S) : Günther HANDKE

It is certified that error appears in the above-indentified patent and that said Letters Patent is hereby corrected as shown below:

On the title page, item [75], before 'Handke,', delete "Gönther" and insert --Günther--.

In column 6, line 3, after 'guiding', delete "said" and insert --and--.

In column 6, line 29, after 'fluid', delete "flow" and insert --flows--.

In column 7, line 10, after 'be', delete "increase" and insert --increased--.

In column 7, line 66, after 'carrrier', delete "32a," and insert --39a,--.

In column 9, line 14, after 'rod' insert --guiding and sealing unit 83 such that when inserting the piston--.

In column 9, line 25, after 'tube', delete "19" and insert --10--.

UNITED STATES PATENT AND TRADEMARK OFFICE
CERTIFICATE OF CORRECTION

PATENT NO. : 5,398,789
DATED : March 21, 1995
INVENTOR(S) : Günther HANDKE

It is certified that error appears in the above-indentified patent and that said Letters Patent is hereby corrected as shown below:

In column 9, line 27, after 'base' insert --member 12. Thus, the correct operational position of the pressure--.

In column 9, line 44, before 'FIG.' insert --In--.

Signed and Sealed this

Thirty-first Day of December, 1996

*Attest:*

BRUCE LEHMAN

*Attesting Officer*    *Commissioner of Patents and Trademarks*